United States Patent [19]

Blumenstock et al.

[11] Patent Number: 5,353,771
[45] Date of Patent: Oct. 11, 1994

[54] METHOD AND ARRANGEMENT FOR DIAGNOSING A TANK-VENTING SYSTEM OF A MOTOR VEHICLE

[75] Inventors: Andreas Blumenstock, Ludwigsburg; Helmut Denz, Stuttgart, both of Fed. Rep. of Germany

[73] Assignee: Robert Bosch GmbH, Stuttgart, Fed. Rep. of Germany

[21] Appl. No.: 194,263

[22] Filed: Feb. 10, 1994

[30] Foreign Application Priority Data

Feb. 11, 1993 [DE] Fed. Rep. of Germany ....... 4303997

[51] Int. Cl.$^5$ .......................................... F02M 33/02
[52] U.S. Cl. .............................. 123/520; 123/198 D
[58] Field of Search ............... 123/516, 518, 519, 520, 123/198 D

[56] References Cited

U.S. PATENT DOCUMENTS

| | | | |
|---|---|---|---|
| 5,193,512 | 3/1993 | Steinbrenner et al. | 123/198 D |
| 5,237,979 | 8/1993 | Hyodo et al. | 123/520 |
| 5,261,379 | 11/1993 | Lipinski et al. | 123/198 D |
| 5,265,577 | 11/1993 | Denz et al. | 123/198 D |
| 5,297,528 | 3/1994 | Mukai | 123/520 |
| 5,297,529 | 3/1994 | Cook et al. | 123/520 |

Primary Examiner—E. Rollins Cross
Assistant Examiner—Thomas N. Moulis
Attorney, Agent, or Firm—Walter Ottesen

[57] ABSTRACT

The invention relates to a method and an arrangement for diagnosing a tank-venting system of a motor vehicle wherein a pregiven underpressure is adjusted in the tank-venting system in order to determine if the system is tight. Then, a check is made to determine at which gradient this underpressure decays when the tank-venting system is completely closed. The system is evaluated as being leaky when the underpressure decays more rapidly than corresponding to a pregiven threshold. To arrive at the pregiven underpressure, much more vapor must be pumped from the system for an empty tank than for a full tank. The pulse-duty factor for opening the tank-venting valve on the system is made to vary in dependence upon the fill level of the tank in order that pumping does not take place too rapidly or too intensely for a full tank and not too long for an almost-empty tank. The dependency on the fill level of the tank is varied in that the valve for a tank which is almost full is driven with a low pulse-duty factor in order to obtain only a small vapor throughput; whereas, for a tank which is almost full, a very large pulse-duty factor is selected.

7 Claims, 5 Drawing Sheets

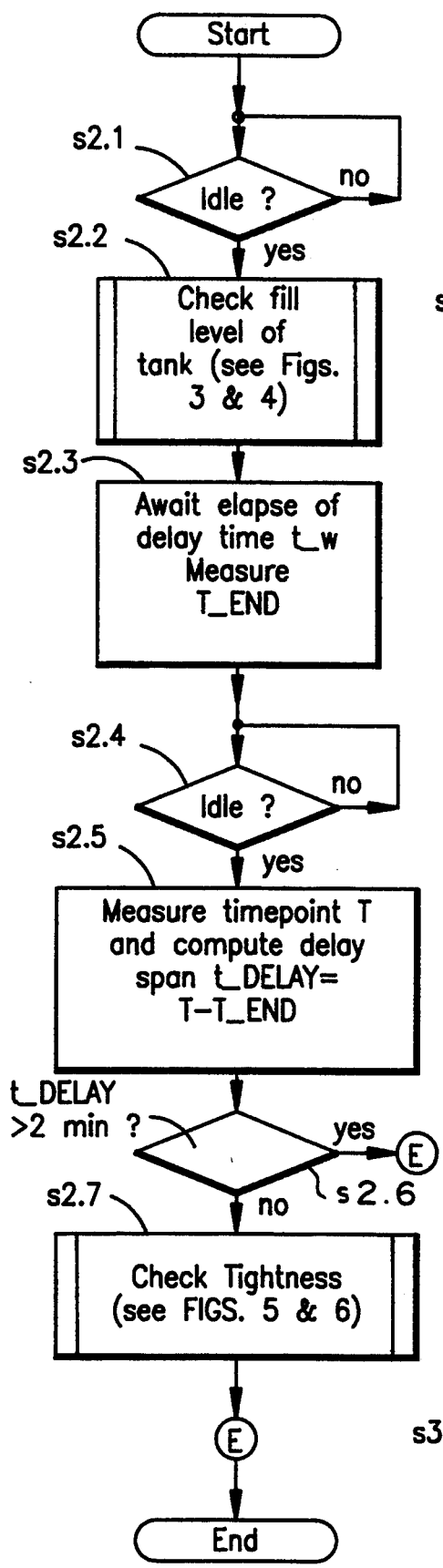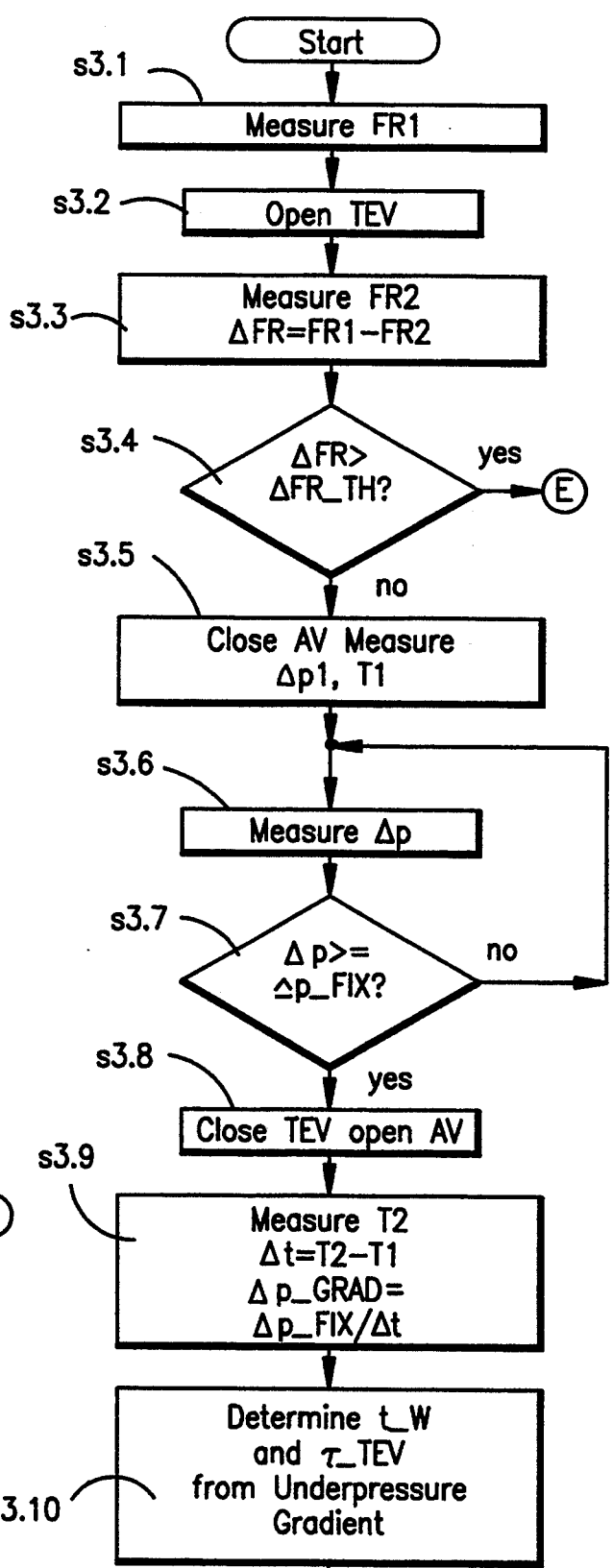
Fig. 2
Fig. 3

METHOD AND ARRANGEMENT FOR DIAGNOSING A TANK-VENTING SYSTEM OF A MOTOR VEHICLE

BACKGROUND OF THE INVENTION

In the following, the magnitude of an underpressure in the tank-venting system is discussed. Here, a "high" underpressure refers to an underpressure having a high absolute value. Correspondingly, a threshold underpressure is then exceeded by the actual underpressure when the absolute value of the actual underpressure is greater than the absolute value of the threshold underpressure.

U.S. patent application Ser. No. 08/070,334, filed May 26, 1993, is incorporated herein by reference and discloses a method and an arrangement for diagnosing a tank-venting system wherein the decay gradient for the underpressure in the tank-venting system is used. The tank-venting system includes: a tank having a tank-pressure sensor; an adsorption filter which is connected to the tank via a tank-supply line and which has a venting line closeable by a shutoff valve; and, a tank-venting valve which is connected to the adsorption filter via a tank-venting line. The shutoff valve is closed to produce underpressure and the tank-venting valve is opened. The tank-venting valve is again closed as soon as a pregiven underpressure has developed. In this way, the underpressure decays and does so relatively slowly when the tank-venting system is tight. However, the underpressure decay gradient is not only dependent upon the tightness of the system, but also on the fill level in the tank. This influence can, however, be substantially eliminated when the underpressure build-up gradient is measured and the two gradients are set into relationship with each other. This is disclosed in U.S. patent application Ser. No. 08/129,039, filed Oct. 4, 1993 and incorporated herein by reference.

For the build-up of underpressure, the tank-venting valve is opened in the methods known to date at a pregiven maximum pulse-duty factor. This pulse-duty factor is so selected that the desired underpressure is not reached before a desired minimum time span has elapsed even for a tank which is almost full. This time span is especially selected in dependence upon the time-dependent detection of other measured variables such as a lean-correction measured variable. If the tank is relatively empty, the time span for pumping out the tank-venting system to the desired underpressure is considerably lengthened because of the fixed pulse-duty factor. This lengthening operates directly on the time span which is necessary for the overall checking sequence. A lengthening of this time span is, however, critical because a tank-venting diagnosis with an evaluation of the underpressure decay gradient can only supply reliable results during specific operating conditions of a motor vehicle. Idle is especially preferred. Idle phases typically last only several 10 second increments. For this reason, the check time span cannot be too greatly increased by the time span required to reach the desired underpressure. It should here be noted that for a tank having a holding capacity of 60 liters and a pulse-duty factor of 10% at idle, a 2.5 liter four-cylinder spark-ignition engine requires approximately 40 seconds until an underpressure of 5 hPa is reached.

SUMMARY OF THE INVENTION

In view of the foregoing, it is an object of the invention to provide a method and an arrangement for diagnosing a tank-venting system which is so configured that the diagnosis can be carried out as rapidly as possible.

The method of the invention is for checking the operability of a tank-venting system of a motor vehicle having an internal combustion engine. The tank-venting system includes: a tank having a tank-pressure sensor; an adsorption filter connected to the tank by a tank-supply line and having a venting line closeable by a shutoff valve; and, a tank-venting valve connected to the adsorption filter via a valve line. The method includes the steps of:

(a) determining the fill level of the tank and setting a pulse-duty factor on the basis of the determined fill level so that the tank-venting valve can be opened with the pulse-duty factor during a subsequent check of tightness of the tank-venting system;

(b) conducting the check for tightness with at least the following steps:

(b1) opening the tank-venting valve at said pulse-duty factor and closing the shutoff valve;

(b2) closing the tank-venting valve as soon as a pregiven pressure condition is satisfied;

(b3) determining the underpressure decay gradient for the underpressure decaying in the tank; and, (b4) evaluating the tightness of the tank-venting system using the determined underpressure decay gradient.

The method utilizes the realization that, for a tank which is almost empty, much more vapor than for a tank that is almost full must be pumped from the tank-venting system via the tank-venting valve into the intake pipe of the internal combustion engine until a desired underpressure is reached. When it is necessary to evacuate more vapor, then pumping must be more rapid so that different time spans are not needed for evacuating different vapor quantities. Accordingly, with the invention, the pulse-duty factor for opening the tank-venting valve is selected to be that much greater the emptier the tank is. That is, the fill level is first determined in any desired manner and a pulse-duty factor is fixed on the basis of this fill level and then, in the starting phase of the check for tightness for which a desired underpressure is to be set, the tank-venting valve is driven with this fixed pulse-duty factor. In this way, the desired underpressure can always be set in a relatively short time span. As soon as this underpressure is reached, the tank-venting valve is closed and the underpressure decay gradient is determined.

The diagnosis can then either take place with the aid of this decay gradient alone or in combination with the pressure build-up gradient in the manner described in U.S. patent application Ser. No. 08/129,039. However, the pressure build-up gradient must be normalized to a reference pulse-duty factor.

If the tank is not provided with a tank-fill level sensor, then the following method steps are to be carried out:

(a1) opening the tank-venting valve with a pregiven pulse-duty factor and closing the shutoff valve;

(a2) determining the underpressure build-up gradient for the underpressure building up in the tank; and, (a3) fixing a pulse-duty factor based on the underpressure build-up gradient determined so that the tank-venting valve can be opened with the pulse-duty factor when the system is tested for tightness.

With this embodiment of the method of the invention, the tank-venting system is at first evacuated in the manner of a sampling. If a pregiven underpressure is reached within a very short time, this shows that the tank is relatively full; whereas, if this time span is long, then it is assumed that the tank is quite empty.

In practice, it is sufficient to fix only very few pulse-duty factors for pregiven tank-level ranges, for example: a first pulse-duty factor for a tank which is $\frac{2}{3}$ or more full; a second pulse-duty factor for a tank which is between $\frac{1}{3}$ to $\frac{2}{3}$ full; and, a third pulse-duty factor for a tank which is up to $\frac{1}{3}$ full.

The arrangement of the invention is preferably realized with the aid of a programmable control apparatus which is so programed that it executes the method of the invention.

BRIEF DESCRIPTION OF THE DRAWINGS

The invention will now be described with reference to the drawings wherein:

FIG. 2 is a flowchart showing a diagnostic method according to the invention;

FIG. 3 is a flowchart for a tank-fill level check within the flowchart of FIG. 2;

DESCRIPTION OF THE PREFERRED EMBODIMENTS OF THE INVENTION

Figure 1:
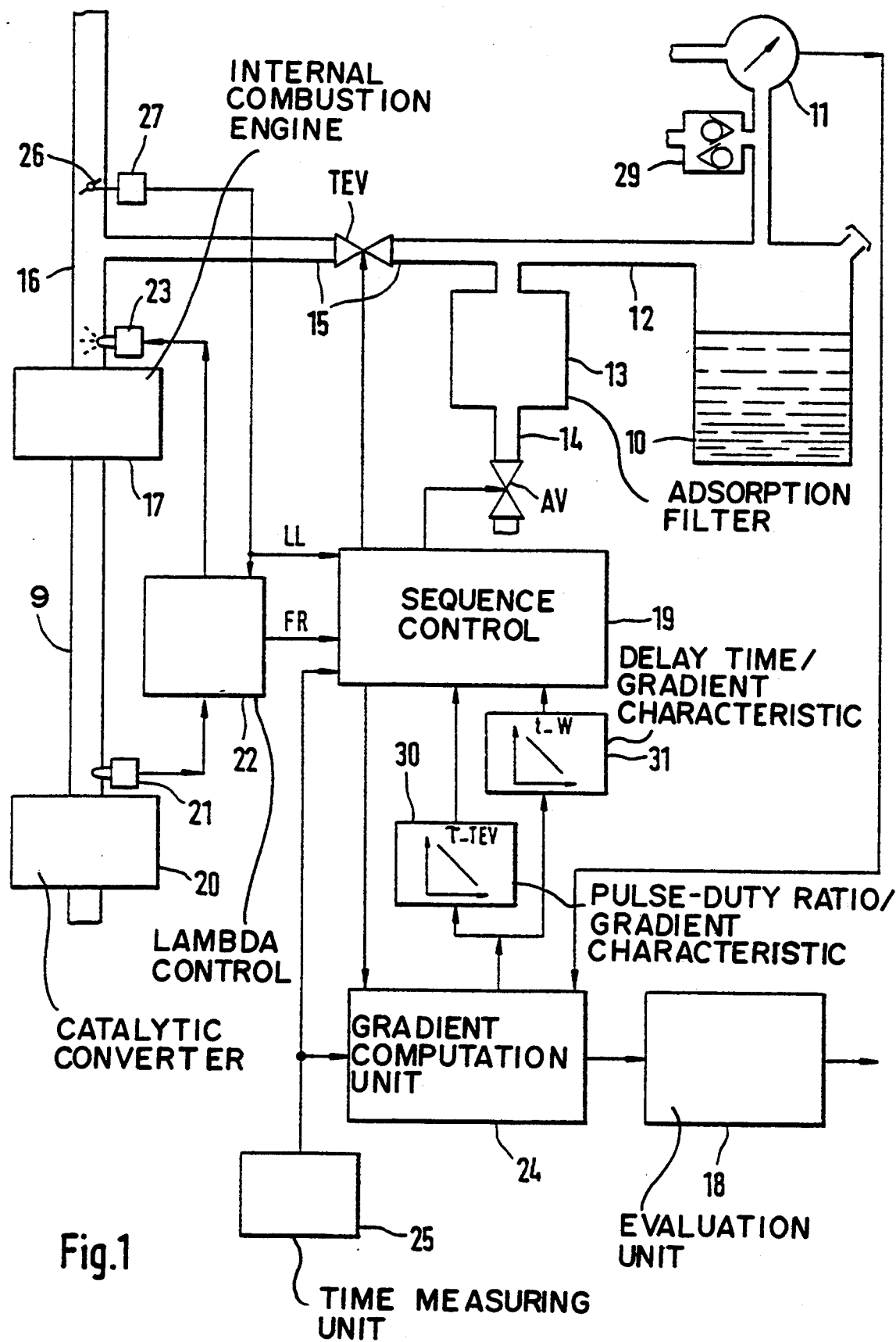
FIG. 1 is a schematic block diagram of an arrangement according to the invention for diagnosing a tank-venting system.

FIG. 1 shows a tank-venting system which includes the following: a tank 10 having a pressure-difference sensor 11; an adsorption filter 13 connected to the tank via a tank-supply line 12 with the adsorption filter 13 including a venting line 14 having a shutoff valve AV mounted therein; and, a tank-venting valve TEV which is mounted in a valve line 15 which connects the adsorption filter to the intake pipe 16 of an internal combustion engine 17. The tank-venting valve TEV and the shutoff valve AV are driven by a sequence control 19. The tank-venting valve TEV is driven also in dependence upon the operating state of the engine 17 and independently of the diagnostic sequence described herein which is typically executed only once per driving cycle. A catalytic converter 20 is mounted in the exhaust-gas channel 9 of the engine 17 and an oxygen probe 21 is mounted forward of the catalytic converter as shown. Oxygen probe 21 emits its signal to a lambda-control unit 22 which determines an actuating signal for an injection device 23 in the intake pipe 16.

An evaluation of the tank-venting system as being operational or not is made with the aid of a gradient computation unit 24 and an evaluation unit 18. In addition, a clock 25 is provided. A pulse-duty ratio/gradient characteristic 30 as well as a delay time/gradient characteristic 31 are connected between the gradient computation unit 24 and the sequence control 19.

The sequence control 19 starts a sequence to check the operability of the tank-venting system as soon as an idle-signal transducer 27 indicates idle. The idle-signal transducer 27 coacts with the throttle flap 26 of the engine. In addition, it can be required that a road-speed signal transducer indicates standstill or slow movement of the corresponding motor vehicle. The check of this condition is characterized in FIG. 2 by a step s2.1. As soon as the condition is satisfied, a tank-fill level check is carried out in a method step s2.2 which check is described in greater detail with respect to FIGS. 3 and 4a to 4d. A check concerning the operability of the tank-venting system should follow this tank-fill level check. However, that check only takes place in step s2.7. This is so because inquiries must be made with respect to various conditions. First, it should be noted that a normal pressure should first be present in the tank especially when not only the underpressure decay gradient is to be used for diagnosis but also the build-up gradient. For this reason, the elapse of a delay time t_W is awaited in a step s2.3. The emptier the tank, the longer it takes until the tank is again at normal pressure starting from a pregiven underpressure. For this reason, the delay time is dependent upon the level to which the tank is filled and this is considered with the aid of the delay time/gradient characteristic 31.

Furthermore, it should be noted that tile conditions for a tightness check are perhaps not immediately present after a tank-fill level check. For this reason, the termination time point T_END is measured in step s2.3. In step s2.4, an inquiry is made as to whether idle is present. If this is the case, then the corresponding time point T is measured in a step s2.5. A delay time span t_DELAY is computed as the difference between T and T_END. If this delay time is less than a pregiven time span (2 minutes in the example), which can be checked in a step s2.6, the above-mentioned tightness checking step s2.7 is reached. The entire method is completed with the end of step s2.7.

It should be noted that, when a tank-fill level sensor is provided, the number of method steps of FIG. 2 can be considerably reduced in order to nonetheless arrive at the same result. Then, only the level has to be measured and, with the aid thereof, a pulse-duty factor for driving the tank-venting valve during the tightness check is determined and then this tightness check is carried out. The fill level is measured in the sequence of FIG. 2 in the tank-fill level check of step s2.2.

For the following, it is, however, assumed that a fill level sensor of the kind referred to above is not available.

The sequence of the tank-fill level check according to the embodiment of the invention is described with respect to FIGS. 3 and 4a to 4d.

Figure 4A:
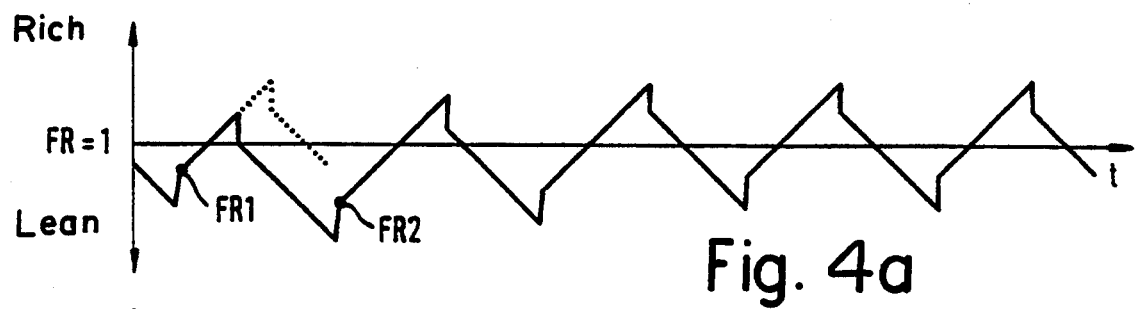
FIGS. 4a to 4d show time-correlated signal traces for explaining the method sequence of FIG. 3.
Figure 4B:
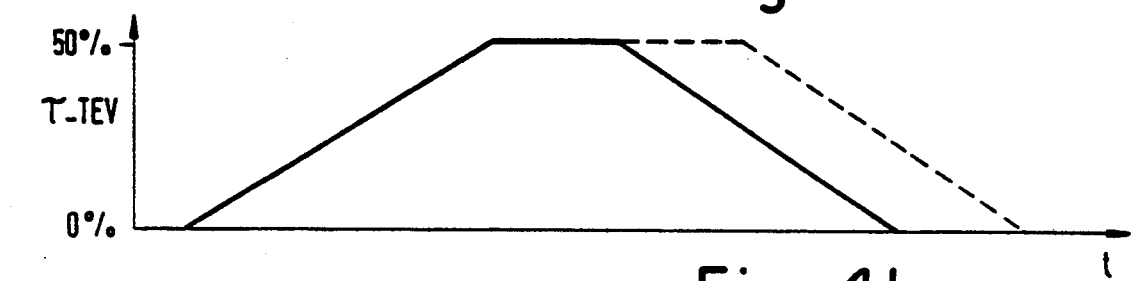
Figure 4C:

In step s3.1 of the sequence shown in FIG. 3, the correction factor FR1 is measured at a typical time point. This correction factor is emitted by the lambda-control unit 22. According to FIG. 4a, this time point is the time point at the end of a p-jump from "lean" in the direction of "rich". At the same time as this measurement, the tank-venting valve is opened with a pregiven pulse-duty factor (step s3.2). The opening can take place suddenly in response to a pregiven pulse-duty factor which, however, should not be too great and should, for example, not exceed 10% since the danger exists that almost exclusively fuel vapors are drawn by suction from the tank-venting system and this could lead to a mixture which is so rich that the engine dies. For this reason, the tank-venting valve is driven only slowly in this embodiment as shown in FIG. 4b.

With respect to the scale of the time axes in FIGS. 4a to 4d and 6a to 6d, it is here noted that a lambda-control oscillation in idle takes typically approximately 4 seconds. From a comparison of FIGS. 4a and 4b, it can be seen that the tank-venting valve is driven up to a pulse-duty factor of 50% within approximately 10 seconds.

This drive up to the above-mentioned high value takes place, however, only when the lambda-control unit 22 does not previously indicate a fuel-rich vapor from the tank-venting system because of a high lean correction. This is checked in steps s3.3 and s3.4. In step s3.3, the control factor FR is measured when the same reference condition is again satisfied as previously, here, the end of the p-jump from the lean condition to the rich condition. The measured value is FR2. The difference between FR1 and FR2 is $\Delta FR$.

In step s3.4, a check is made as to whether $\Delta FR$ lies above a threshold $\Delta FR\_TH$. If this is the case, then the check method as a whole is ended. This has two reasons. First, in the case of an intensely vaporizing fuel, no pressure gradient measurements are permitted which provide a representative picture for the tightness of the tank-venting system. The second reason is that, when much fuel is drawn by suction from the tank-venting system, this is an indication that the tank-venting system should be scavenged which, however, is not possible during the test method.

The shutoff valve AV is closed in step s3.5 when no fuel or only so little fuel is drawn by suction from the tank-venting system that no disturbance of the further test is to be expected. The corresponding time span T1 and the corresponding underpressure $\Delta p1$ are measured.

In steps s3.6 and s3.7, a determination is made as to whether the pregiven underpressure has already been reached by means of continuously repeated measurements of the underpressure (step s3.6) and by a comparison (step s3.7) of the measured underpressure with a pregiven underpressure $\Delta p\_FIX$. This was 5 hPa in the embodiment. As soon as this pregiven underpressure is reached, then the tank-venting valve TEV is closed in step s3.8 and the shutoff valve AV is opened. Furthermore, in step s3.9, the corresponding time span T2 is measured and the time span $\Delta t = T2 - T1$ is computed. The underpressure build-up gradient $\Delta p\_GRAD$ is determined for $\Delta p\_FIX / \Delta t$. When this gradient is to be used in the subsequent tightness test, which is not the case in the embodiment, then it is recommended that not only the value $\Delta p\_FIX$ should be used as pressure change, but the value $\Delta p\_FIX - \Delta p1$.

Figure 4D:
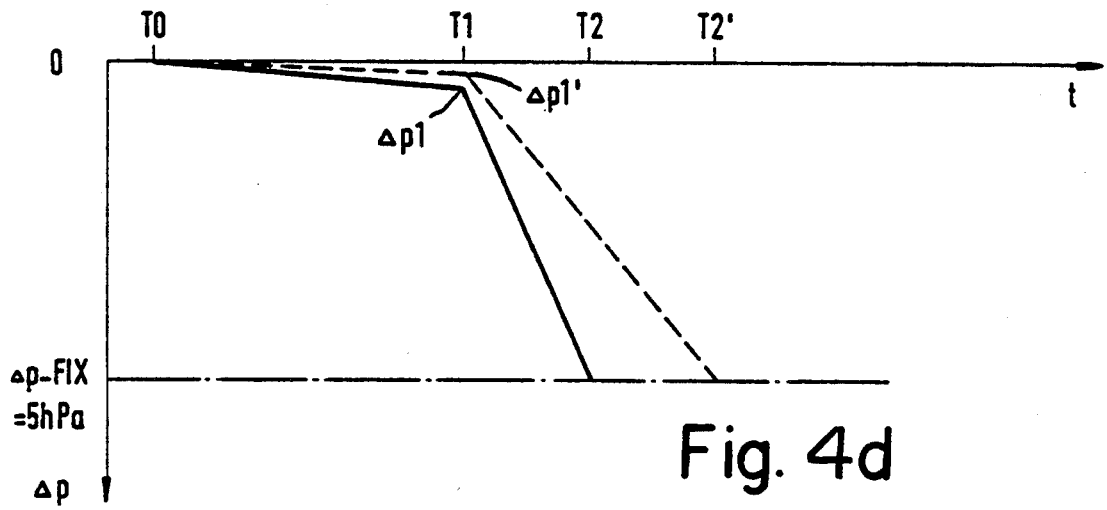

Two curves for the underpressure build-up are shown in FIG. 4d. The solid line is the underpressure build-up for a half-filled tank; whereas, the broken line shows the underpressure build-up for a tank which is almost empty. The underpressure build-up gradient computed in step s3.9 permits a coarse evaluation as to whether the tank is rather empty or is rather half full or is entirely full. This information is not falsified by vaporizing fuel because it was already determined in step s3.4 that the fuel vaporizes hardly or not at all.

As mentioned above, the underpressure build-up gradient is used to determine the delay time $t\_W$ and the pulse-duty factor $\tau\_TEV$ for the tank-venting valve. The pulse-duty factor is that to be used subsequently to check tightness. This takes place in step s3.10 with the aid of characteristics 30 and 31.

The method for checking for tightness in accordance with step s2.7 is now explained in greater detail with respect to FIGS. 5 and 6a to 6d.

Figure 5:
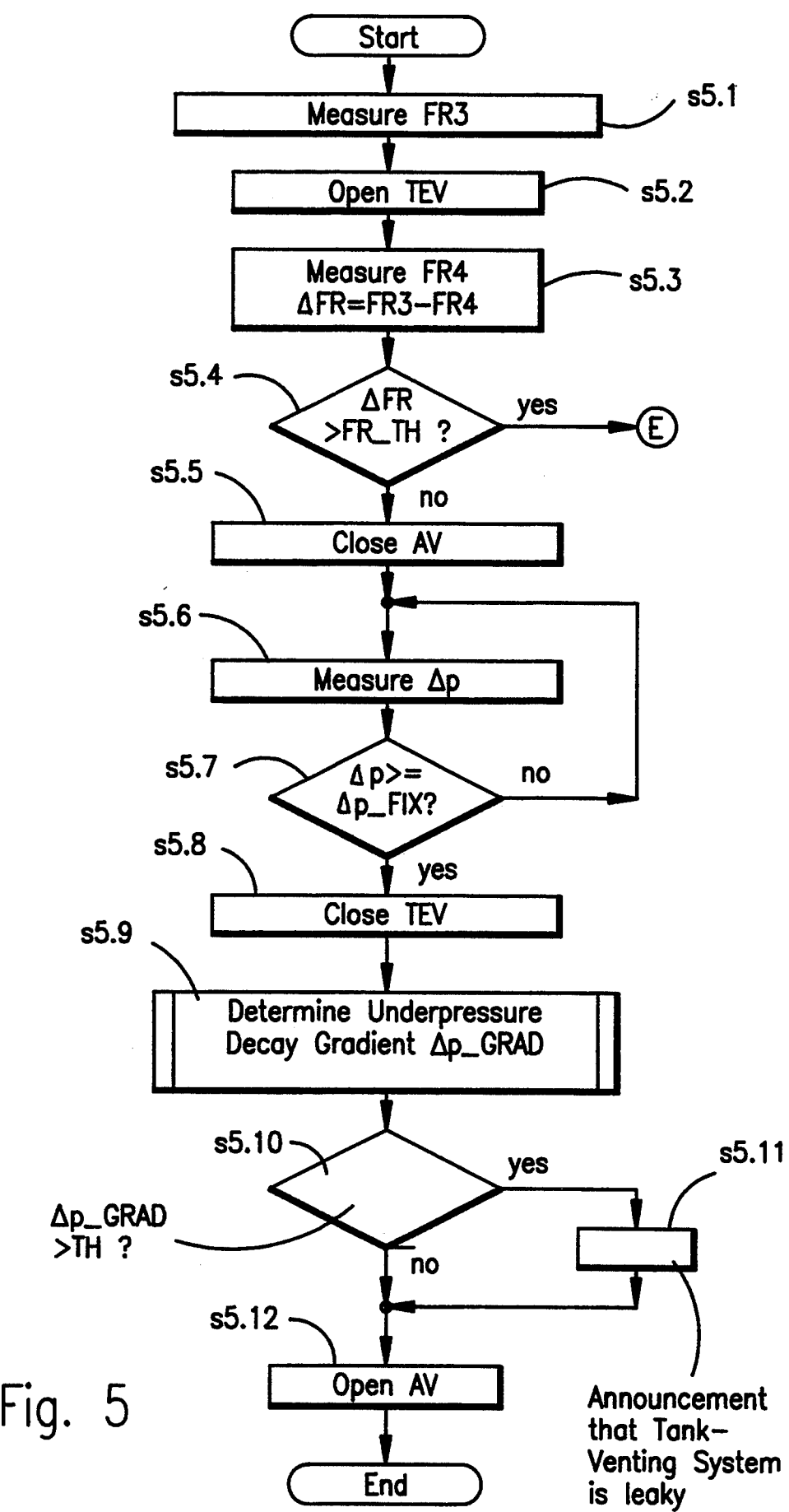
FIG. 5 is a flowchart of a tightness check within the method sequence of FIG. 2; and, FIGS. 6a to 6d show the time-correlated signal traces for explaining the method sequence of FIG. 5.
Figure 6A:
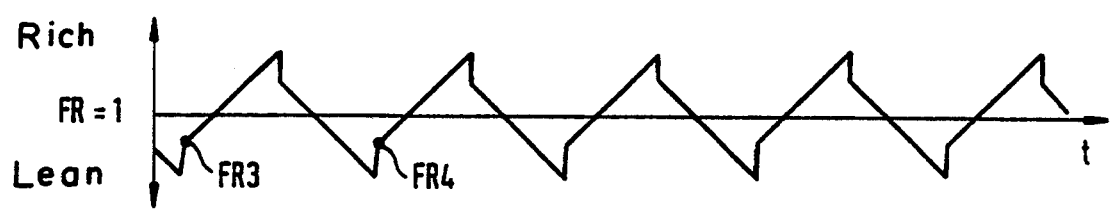
Figure 6B:
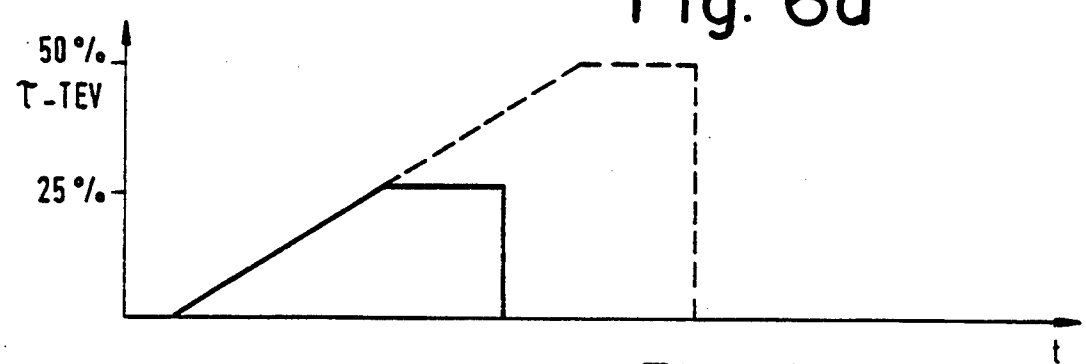

The steps s5.1 to s5.4 of the sequence of FIG. 5 are functionally identical to the steps s3.1 to s3.4. Only the values FR3 and FR4 of the control factor are measured in lieu of the values FR1 and FR2 as can be seen in FIGS. 6a and 6b. The test method is discontinued in step s5.4 if it develops that, when driving the tank-venting valve, a lean correction is required which is too large. Otherwise, step s5.5 follows in which the shutoff valve AV is closed whereupon a check is made in steps s5.6 and s5.7 as to whether the underpressure $\Delta p\_FIX$ has already been reached (steps s5.6 and s5.7 correspond to steps s3.6 and s3.7, respectively, which have been explained above). As soon as this is the case, the tank-venting valve TEV is closed in step s5.8. This is the case at a time point T5 (FIGS. 6a to 6d). From here on, the underpressure in the tank slowly decays.

In step s5.9, the underpressure decay gradient $\Delta p\_GRAD$ is determined which takes place in that the underpressure reduction within a predetermined time interval is measured or the time interval needed for a pregiven pressure decay is measured and then the underpressure reduction is divided by the time interval. In step s5.10, a check is made as to whether this underpressure decay gradient is greater than a threshold value TH. If this is the case, then an announcement is outputted in step s5.11 that the system leaks. After this step or directly after the step s5.10, a subsequent step s5.12 is reached wherein the shutoff valve AV is again opened.

Figure 6C:
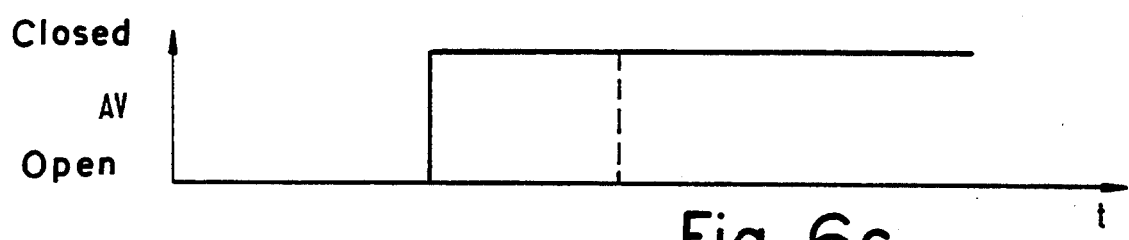
Figure 6D:
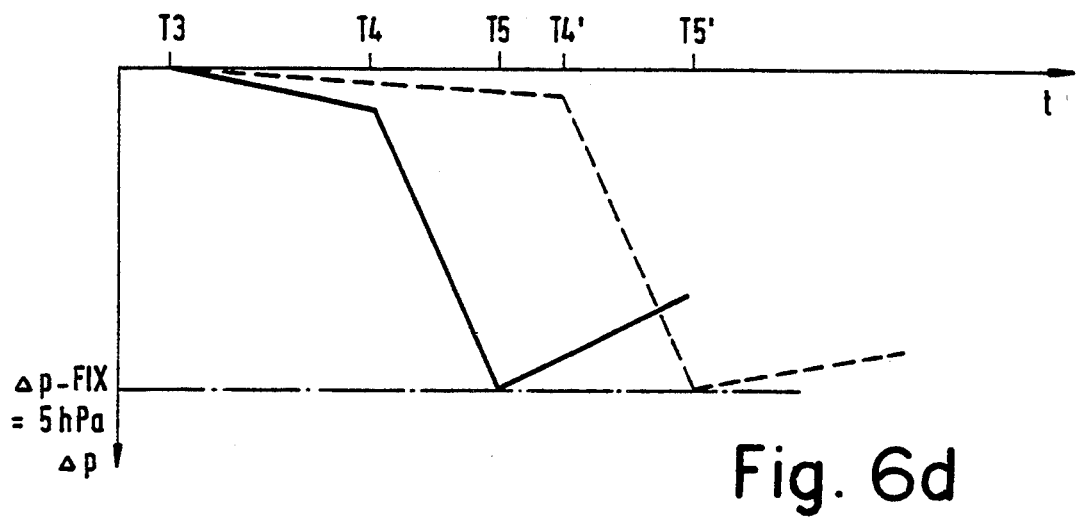

FIGS. 6b to 6d show that the time sequences for the half-full tank (solid line) and the almost-empty tank (broken line) are different. In the case of the half-full tank, the pulse-duty factor of 25% is reached at time point T4 whereupon this pulse-duty factor is no longer changed but the shutoff valve is closed. The pulse-duty factor for the above is determined in step s3.10. In the case of the almost-empty tank, a pulse-duty factor $\tau\_TEV$ of 50% was pregiven in step s3.10 which is only reached at time point T4'. Here too, the shutoff valve is closed and the pulse-duty factor is maintained. In both cases, the time span starting with the closure of the shutoff valve up to reaching the pregiven underpressure $\Delta p\_FIX$ is essentially the same. For a half-full tank, it is the time span T5-T4; whereas, in the case of the almost-empty tank, it is the time span T5'-T4'. A pulse-duty factor of, for example, 12.5% is set for an almost-full tank.

As explained initially, the pulse-duty factor for a full tank is always used in the state of the art. This has the consequence that, in the case of an almost-empty tank, the time span, which elapses until the underpressure $\Delta p\_FIX$ is reached in the tank, is significantly longer than the time span T5'-T4' in FIGS. 6a to 6d.

The pulse-duty factor for opening the tank-venting valve is made dependent upon the fill level of the tank when building up the underpressure for the check of tightness. For this reason, a pressure build-up which is too rapid or too intense can be prevented when the tank is full; whereas, for a tank which is almost empty, the test time span can be held short since the tank-venting valve is driven with a very large pulse-duty factor in order to obtain a rapid underpressure build-up notwithstanding the large volume to be pumped out.

In the sequence of FIG. 5, the entire tightness test in step s5.10 takes place only with the evaluation of the underpressure decay gradient. However, it should be noted that, for the invention, the specific tightness evaluation method is not important. It is only essential that a method be used wherein an underpressure must be built up and that this underpressure build-up takes place with the aid of opening pulse-duty factors of the tank-venting valve which are dependent upon the fill level of the tank.

It is further noted that the principle of the invention is not limited only to a check for tightness. With the aid of the underpressure build-up gradient and the underpressure decay gradient, blockages in a tank-venting system can be determined as described, for example, in U.S. patent application Ser. No. 08/070,334 or U.S. patent application Ser. No. 08/129,039. Tests of this kind can be carried out in addition to the tests described for the embodiment. It is only essential that a desired underpressure be set while using a pulse-duty factor for the tank-venting valve which is dependent upon the fill level of the tank.

It is understood that the foregoing description is that of the preferred embodiments of the invention and that various changes and modifications may be made thereto without departing from the spirit and scope of the invention as defined in the appended claims.

What is claimed is:

1. A method of checking the operability of a tank-venting system of a motor vehicle having an internal combustion engine, the tank-venting system including: a tank having a tank-pressure sensor; an adsorption filter connected to the tank by a tank-supply line and having a venting line closeable by a shutoff valve; and, a tank-venting valve connected to the adsorption filter via a valve line; the method comprising the steps of:
    (a) determining the fill level of the tank and setting a pulse-duty factor on the basis of the determined fill level so that the tank-venting valve can be opened with said pulse-duty factor during a subsequent check for tightness of the tank-venting system;
    (b) conducting said check for tightness with at least the following steps:
        (b1) opening the tank-venting valve at said pulse-duty factor and closing the shutoff valve;
        (b2) closing the tank-venting valve as soon as a pregiven pressure condition is satisfied;
        (b3) determining the underpressure decay gradient for the underpressure decaying in the tank; and,
        (b4) evaluating the tightness of the tank-venting system using the determined underpressure decay gradient.

2. The method of claim 1, further comprising the steps subsidiary to step (a):
    (a1) opening the tank-venting valve with a pregiven pulse-duty factor and closing the shutoff valve;
    (a2) determining the underpressure build-up gradient for the underpressure building up in the tank; and,
    (a3) fixing a pulse-duty factor based on the underpressure build-up gradient determined so that the tank-venting valve can be opened with said pulse-duty factor when the system is tested for tightness.

3. The method of claim 2, further comprising the following additional steps as part of step (a1) or as part of step (b1): performing a lean correction test and discontinuing the method when the determined lean correction exceeds a pregiven threshold.

4. The method of claim 3, wherein the determination of fill level of the tank and check for tightness of the tank-venting system are carried out only at pregiven operating conditions of the engine.

5. The method of claim 4, wherein the check for tightness of said system is made in one of the next idle phases after the idle phase with the check as to fill level when said idle phase was not long enough for a directly subsequent check for tightness.

6. The method of claim 5, wherein the test for tightness of said tank-venting system is only carried out when the conditions for this test are present within a pregiven time span after the test for the tank fill level is completed.

7. An arrangement for checking the operability of a tank-venting system of a motor vehicle having an internal combustion engine, the tank-venting system including: a tank having a tank-pressure sensor; an adsorption filter connected to the tank by a tank-supply line and having a venting line closeable by a shutoff valve; and, a tank-venting valve connected to the adsorption filter via a valve line; the arrangement comprising:
    a time-measuring unit;
    a gradient computation unit for computing underpressure change gradients with the aid of signals from said tank-pressure sensor and said time-measuring unit;
    an evaluation unit for evaluating the operability of the tank-venting system based on signals from said gradient computation unit;
    sequence control means for controlling the opening and closing of said tank-venting valve and said shutoff valve as a function of time in a manner to permit detection of underpressure change gradients;
    said sequence control means further including means for carrying out the following sequences:
        (a) determining the fill level of the tank and setting a pulse-duty factor on the basis of the determined fill level so that the tank-venting valve can be opened with said pulse-duty factor during a subsequent check for tightness of the tank-venting system;
        (b) conducting said check for tightness with at least the following steps:
            (b1) opening the tank-venting valve at said pulse-duty factor and closing said shutoff valve;
            (b2) closing said tank-venting valve as soon as a pregiven pressure condition is satisfied;
            (b3) determining the underpressure decay gradient for the underpressure decaying in the tank; and,
            (b4) evaluating the tightness of the tank-venting system
    using the determined underpressure decay gradient.

* * * * *